United States Patent
Oowada et al.

(10) Patent No.: US 11,421,770 B2
(45) Date of Patent: Aug. 23, 2022

(54) POWER TRANSMISSION MECHANISM

(71) Applicant: SUBARU CORPORATION, Tokyo (JP)

(72) Inventors: Norio Oowada, Tokyo (JP); Tatsuhiro Kubo, Tokyo (JP); Gen Hariu, Tokyo (JP); Ryou Kanome, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/212,559

(22) Filed: Mar. 25, 2021

(65) Prior Publication Data

US 2021/0317901 A1 Oct. 14, 2021

(30) Foreign Application Priority Data

Apr. 10, 2020 (JP) .............................. JP2020-071133

(51) Int. Cl.
| | |
|---|---|
| *F16H 48/22* | (2006.01) |
| *F16H 48/34* | (2012.01) |
| *F16H 48/10* | (2012.01) |
| *F16H 48/36* | (2012.01) |

(52) U.S. Cl.
CPC ....... *F16H 48/22* (2013.01); *F16H 2048/106* (2013.01); *F16H 2048/343* (2013.01); *F16H 2048/364* (2013.01)

(58) Field of Classification Search
CPC ......... F16H 48/10–11; F16H 48/34–2048/346; F16H 48/36–2048/368; B60K 2023/043
See application file for complete search history.

(56) References Cited

U.S. PATENT DOCUMENTS

| | | | |
|---|---|---|---|
| 5,984,034 A | 11/1999 | Morisawa et al. | |
| 7,491,146 B2* | 2/2009 | Sharma | B60K 23/04 475/221 |
| 10,451,162 B2* | 10/2019 | Furukawa | F16H 48/24 |
| 10,648,549 B2* | 5/2020 | Kurth | F16H 48/30 |
| 2021/0301912 A1* | 9/2021 | Isono | F16H 48/10 |

FOREIGN PATENT DOCUMENTS

| | | | | |
|---|---|---|---|---|
| JP | H09-298802 A | 11/1997 | | |
| WO | WO-2011064041 A1 * | 6/2011 | .............. | B60L 50/16 |
| WO | WO-2014169912 A1 * | 10/2014 | ........... | B60K 17/346 |

* cited by examiner

*Primary Examiner* — Ernesto A Suarez
*Assistant Examiner* — James J Taylor, II
(74) *Attorney, Agent, or Firm* — McGinn I.P. Law Group, PLLC

(57) ABSTRACT

A power transmission mechanism including a planetary mechanism, an electronically controlled clutch, and a motor generator. The planetary mechanism is coupled to an input shaft and first and second output shafts. The planetary mechanism includes a differential element rotating the first and second output shafts at different rotation speeds. The planetary mechanism outputs a torque input to the first and second output shafts. The electronically controlled clutch includes first and second clutch plates. The first clutch plate is coupled to a member different from the differential element. The second clutch plate is coupled to the differential element. The electronically controlled clutch allows the differential element to rotate the first and second output shafts at the different rotation speeds when the first and second clutch plates are released. The electronically controlled clutch restricts a rotation speed difference in response to engaging between the first and second clutch plates.

4 Claims, 9 Drawing Sheets

POWER TRANSMISSION MECHANISM

CROSS-REFERENCE TO RELATED APPLICATIONS

The present application claims priority from Japanese Patent Application No. 2020-071133 filed on Apr. 10, 2020, the entire contents of which are hereby incorporated by reference.

BACKGROUND

The disclosure relates to a power transmission mechanism that transmits power of a drive source to wheels.

In vehicles such as hybrid electric vehicles, for example, a rotation shaft of a motor as a drive source is coupled to an input shaft of a differential mechanism, and an output shaft of the differential mechanism is coupled to wheels (for example, Japanese Unexamined Patent Application Publication (JP-A) No. H09-298802).

SUMMARY

An aspect of the disclosure provides a power transmission mechanism including a planetary mechanism, an electronically controlled clutch, and a motor generator. The planetary mechanism is coupled to an input shaft, a first output shaft, and a second output shaft. The planetary mechanism includes a differential element configured to rotate the first output shaft and the second output shaft at different rotation speeds. The planetary mechanism is configured to output a torque input from the input shaft to the first output shaft and the second output shaft. The electronically controlled clutch includes a first clutch plate and a second clutch plate. The first clutch plate is coupled to a member of the planetary mechanism different from the differential element. The second clutch plate is coupled to the differential element. The first clutch plate and the second clutch plate face each other. The electronically controlled clutch is configured to allow the differential element to rotate the first output shaft and the second output shaft at the different rotation speeds when the first clutch plate and the second clutch plate are in a released state. The electronically controlled clutch is configured to restrict a rotation speed difference between the first output shaft and the second output shaft in response to engaging between the first clutch plate and the second clutch plate. The motor generator is coupled to the second clutch plate and the differential element.

An aspect of the disclosure provides a power transmission mechanism including an electronically controlled clutch configured to switch among a differential function, a torque vectoring function, a limited-slip differential function, a motor drive function, and a regenerative function. The differential function allows a first output shaft and a second output shaft to rotate at different speeds in response to releasing or engaging between clutch plates. The torque vectoring function outputs different torques to the first output shaft and the second output shaft according to a rotation of a motor generator. The limited-slip differential function restricts a rotation speed difference between the first output shaft and the second output shaft. The motor drive function outputs equal torques to the first output shaft and the second output shaft according to the rotation of the motor generator. The regenerative function causes the motor generator to generate electric power according to a torque received from the first output shaft or the second output shaft.

BRIEF DESCRIPTION OF THE DRAWINGS

The accompanying drawings are included to provide a further understanding of the disclosure and are incorporated in and constitute a part of this specification. The drawings illustrate example an embodiment and, together with the specification, serve to explain the principles of the disclosure.

DETAILED DESCRIPTION

It is desired that a power transmission mechanism that transmits power of a drive source to wheels has many functions (for example, a differential function, a limited-slip differential function, and a torque vectoring function). However, if it is attempted to provide many functions in the power transmission mechanism, the configuration of the power transmission mechanism becomes complicated.

It is desirable to provide a power transmission mechanism that can implement many functions with a simple configuration.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
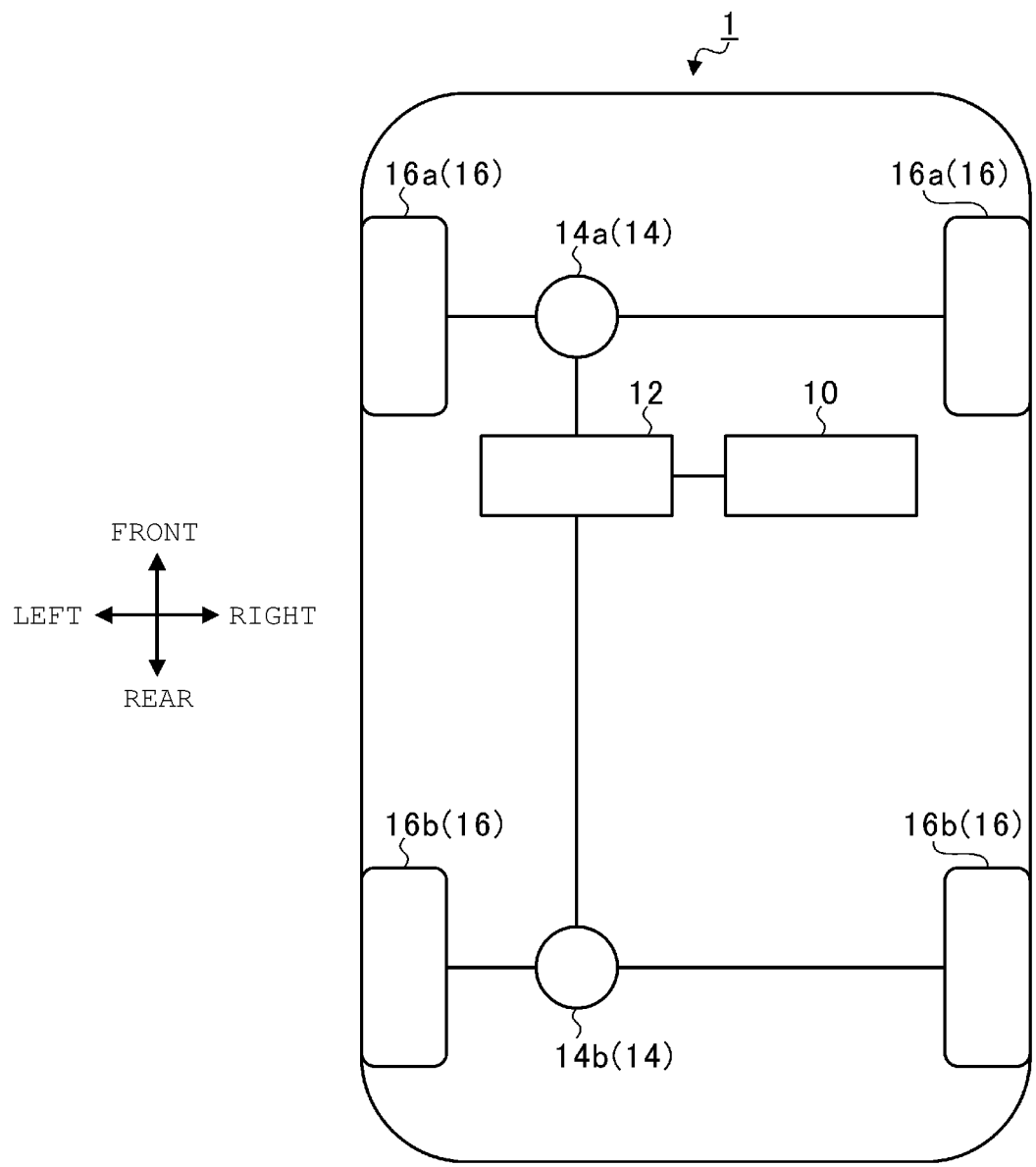
FIG. 1 is a schematic view illustrating a configuration of a vehicle.

FIG. 1 is a schematic view illustrating a configuration of a vehicle 1. The vehicle 1 includes a drive source 10, a transmission 12, power transmission mechanisms 14a, 14b, and front wheels 16a and rear wheels 16b.

It is assumed that the vehicle 1 is an electric vehicle having a motor as the drive source 10. The vehicle 1 may be an engine vehicle in which an engine is provided as the drive source 10. The vehicle 1 may be a hybrid electric vehicle having an engine and a motor as the drive source 10. The drive source 10 consumes, for example, electric power of a battery (not illustrated) to generate a torque.

An output shaft of the drive source 10 is coupled to the transmission 12. The transmission 12 is, for example, a continuously variable transmission. The transmission 12 is coupled to the front wheels 16a through the power transmission mechanism 14a. The power transmission mechanism 14a transmits the torque (power) of the drive source 10 received through the transmission 12 to the front wheels 16a. Further, the transmission 12 is coupled to the rear wheels 16b through the power transmission mechanism 14b. The power transmission mechanism 14b transmits the torque (power) of the drive source 10 received through the transmission 12 to the rear wheels 16b.

Hereinafter, the power transmission mechanism 14a and the power transmission mechanism 14b may be collectively referred to as a power transmission mechanism 14. The power transmission mechanism 14 will be described in detail later. Further, the front wheels 16a and the rear wheels 16b may be collectively referred to as a wheel 16.

Figure 2:
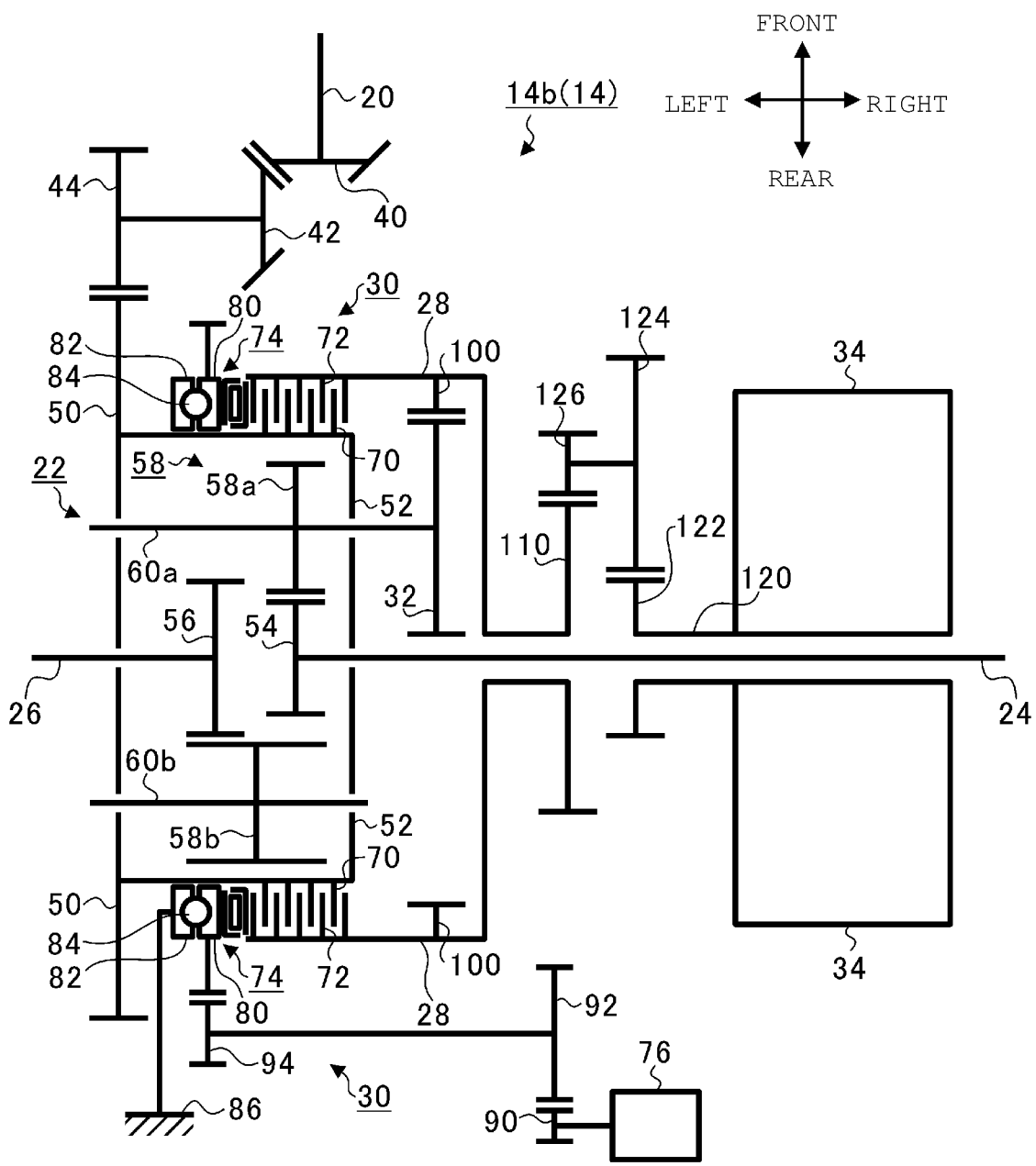
FIG. 2 is a schematic view illustrating a configuration of a power transmission mechanism.

FIG. 2 is a schematic view illustrating a configuration of the power transmission mechanism 14. The power transmission mechanism 14 in FIG. 2 illustrates an example of the power transmission mechanism 14b on a rear side. The power transmission mechanism 14a on a front side is the same as the power transmission mechanism 14b on the rear side.

The power transmission mechanism 14 includes an input shaft 20, a planetary mechanism 22, a first output shaft 24, a second output shaft 26, a clutch case 28, an electronically controlled clutch 30, a limiting gear 32, and a motor generator 34.

The input shaft 20 is, for example, a drive pinion shaft. The input shaft 20 is coupled to the transmission 12 through, for example, a propeller shaft. The torque of the drive source 10 is input to the input shaft 20. A bevel gear 40 is formed at a tip end of the input shaft 20. The bevel gear 40 is meshed with a bevel gear 42. A rotation shaft of the bevel gear 42 is coupled to a rotation shaft of a reduction gear 44. The reduction gear 44 is coupled to the planetary mechanism 22.

The planetary mechanism 22 includes a helical gear 50, a differential case 52, a first sun gear 54, a second sun gear 56, a first pinion gear 58a, and a second pinion gear 58b.

The helical gear 50 is meshed with the reduction gear 44. The differential case 52 is formed in a hollow cylindrical shape. One end of the differential case 52 in an axial direction is fixed to one surface (for example, a right surface) of the helical gear 50. The other end of the differential case 52 in the axial direction is closed by a bottom surface of the differential case 52.

The differential case 52 is coupled to the input shaft 20 through the helical gear 50, the reduction gear 44, and the bevel gears 40, 42. The differential case 52 rotates integrally with the helical gear 50. The first sun gear 54, the second sun gear 56, the first pinion gear 58a, and the second pinion gear 58b are housed in the differential case 52.

The first sun gear 54 and the second sun gear 56 are disposed parallel to the helical gear 50, and face each other at a distance from each other. The first sun gear 54 is coupled to the first output shaft 24. The first output shaft 24 penetrates the differential case 52 and extends to the right. The right wheel 16 is coupled to the first output shaft 24. The second sun gear 56 is coupled to the second output shaft 26. The second output shaft 26 penetrates the helical gear 50 and extends to the left. The left wheel 16 is coupled to the second output shaft 26. The first output shaft 24 and the second output shaft 26 are disposed on the same straight line. That is, central axes of the helical gear 50, the differential case 52, the first sun gear 54, the first output shaft 24, the second sun gear 56, and the second output shaft 26 overlap.

The first pinion gear 58a is meshed with the first sun gear 54. A first pinion shaft 60a is coupled to a center of the first pinion gear 58a. The first pinion shaft 60a is rotatably supported by the helical gear 50 and the differential case 52. That is, the first pinion gear 58a can revolve around an axis of the first output shaft 24 (along a peripheral edge of the first sun gear 54) and is rotatably supported around a central axis of the first pinion gear 58a.

The second pinion gear 58b is meshed with the second sun gear 56. A second pinion shaft 60b is coupled to a center of the second pinion gear 58b. The second pinion shaft 60b is rotatably supported by the helical gear 50 and the differential case 52. That is, the second pinion gear 58b can revolve around an axis of the second output shaft 26 (along a peripheral edge of the second sun gear 56) and is rotatably supported around a central axis of the second pinion gear 58b.

The second pinion gear 58b is meshed with the second sun gear 56 and is also meshed with the first pinion gear 58a. The second pinion gear 58b rotates in a direction opposite to a rotation direction of the first pinion gear 58a according to a rotation of the first pinion gear 58a. That is, the first pinion gear 58a and the second pinion gear 58b form a so-called double pinion.

Figure 3:
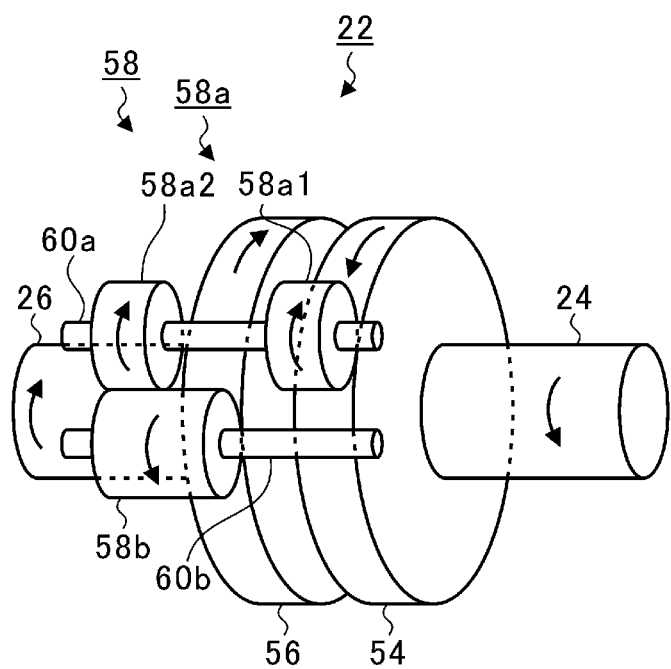
FIG. 3 is a perspective view illustrating an example of a double pinion.

FIG. 3 is a perspective view illustrating an example of the double pinion. For example, it is assumed that the first sun gear 54 and the second sun gear 56 have the same diameter and the same number of teeth. The first pinion gear 58a includes a first piece 58a1 and a second piece 58a2. The first piece 58a1 and the second piece 58a2 have the same diameter and the same number of teeth, and are coupled by the first pinion shaft 60a. The first piece 58a1 is meshed with the first sun gear 54. A position of the second piece 58a2 is displaced in the axial direction with respect to the first sun gear 54 and the second sun gear 56.

It is assumed that the second pinion gear 58b has the same diameter and the same number of teeth as the first pinion gear 58a (that is, the first piece 58a1 and the second piece 58a2). The second pinion gear 58b is meshed with the second sun gear 56. The second pinion gear 58b is longer than the second sun gear 56 in the axial direction and is meshed with the second piece 58a2.

For example, when the first output shaft 24 rotates relatively in a counterclockwise direction, the first sun gear 54 rotates in the counterclockwise direction in conjunction with the first output shaft 24. Then, the first piece 58a1 meshed with the first sun gear 54 rotates in a clockwise direction. In this case, the second piece 58a2 coupled to the first piece 58a1 by the first pinion shaft 60a rotates in the clockwise direction in conjunction with the first piece 58a1. The second pinion gear 58b meshed with the second piece 58a2 rotates in the counterclockwise direction opposite to the rotation direction of the second piece 58a2. Then, the second sun gear 56 meshed with the second pinion gear 58b rotates in the clockwise direction. Then, the second output shaft 26 rotates in conjunction with the second sun gear 56 and rotates in the clockwise direction opposite to that of the first output shaft 24.

Thus, the first pinion gear 58a and the second pinion gear 58b serve as a differential element 58 that rotates the first output shaft 24 and the second output shaft 26 at different rotation speeds. The double pinion is not limited to the illustrated specific example, and may be appropriately designed.

Returning to FIG. 2, the clutch case 28 is generally formed in a cylindrical shape. The clutch case 28 is provided on an outer side of the differential case 52 so as to cover the differential case 52. A central axis of the clutch case 28 overlaps with the central axis of the first output shaft 24. The clutch case 28 is rotatable around the axis of the first output shaft 24.

The electronically controlled clutch 30 includes plural first clutch plates 70, plural second clutch plates 72, a ball cam 74, and a clutch operating motor 76. Hereinafter, the first clutch plates 70 and the second clutch plates 72 may be collectively and simply referred to as a "clutch plate".

The clutch plate is formed in an annular plate shape. The differential case 52 is inserted inside the clutch plate. In other words, the clutch plate is located on an outer peripheral side of the differential case 52 and extends in a radial direction of the differential case 52. A central axis of the clutch plate overlaps the central axis of the first output shaft 24.

The first clutch plates 70 are coupled to a member, different from the differential element 58, of the planetary mechanism 22, such as the differential case 52. Further, the first clutch plates 70 are coupled to the differential case so as to be slidable in the axial direction of the differential case 52 (that is, the axial direction of the first output shaft 24). For example, a spline extending in the axial direction is formed on an outer peripheral surface of the differential case 52. Inner peripheral edges of the first clutch plates 70 are coupled to the spline of the differential case 52, so that the first clutch plates 70 are slidable. Further, outer peripheral edges of the first clutch plates 70 are separated from the clutch case 28.

The second clutch plates 72 are coupled to the clutch case 28. Further, the second clutch plates 72 are coupled to the clutch case 28 so as to be slidable in the axial direction of the clutch case 28 (that is, the axial direction of the first output shaft 24). For example, a spline extending in the axial direction is formed on an inner peripheral surface of the clutch case 28. Outer peripheral edges of the second clutch plates 72 are coupled to the spline on the inner peripheral surface of the clutch case 28, so that the second clutch plates 72 are slidable. Further, inner peripheral edges of the second clutch plates 72 are separated from the differential case 52.

The plural first clutch plates 70 are stacked in the axial direction. Then, the first clutch plates 70 and the second clutch plates 72 are alternately stacked such that each first clutch plate 70 is interposed between adjacent two second clutch plates 72.

The ball cam 74 is provided on one side (for example, the helical gear 50 side (left side)) of the clutch plate in a stacking direction (axial direction). The ball cam 74 includes a pressure plate 80, a cam 82, and a ball 84.

The pressure plate 80 is disposed on a left side of the leftmost surface of the clutch plate. The cam 82 is disposed on a left side of the pressure plate 80 and faces the pressure plate 80. Recesses are formed on facing surfaces of the cam 82 and the pressure plate 80, respectively. The ball 84 is housed in the recesses of the cam 82 and the pressure plate 80, and is sandwiched between the cam 82 and the pressure plate 80. Further, the cam 82 is fixed to a housing 86 that houses, for example, the clutch case 28.

The clutch operating motor 76 is coupled to a reduction gear 90. The reduction gear 90 is meshed with a reduction gear 92. A rotation shaft of the reduction gear 92 is coupled to a rotation shaft of a reduction gear 94. The reduction gear 94 is meshed with teeth provided on an outer peripheral surface of the pressure plate 80. The clutch operating motor 76 can rotate the pressure plate 80 through the reduction gears 90, 92, 94.

When a rotation angle of the clutch operating motor 76 is set to an initial position, there is no displacement in the rotation direction with respect to the cam 82 in the pressure plate 80. When the pressure plate 80 is not displaced in the rotation direction, the pressure plate 80 is located closer to the cam 82 and does not press the clutch plate. In this state, surfaces of the clutch plates are separated from each other, and the electronically controlled clutch 30 is released. When the electronically controlled clutch 30 is in a released state, the differential case 52 and the clutch case 28 can rotate independently (individually) of each other.

On the other hand, when the rotation angle of the clutch operating motor 76 is increased from the initial position, a displacement in the rotation direction with respect to the cam 82 occurs in the pressure plate 80. When the pressure plate 80 is displaced in the rotation direction, the ball 84 moves so as to get over the recesses of the cam 82 and the pressure plate 80, and the pressure plate 80 is pushed out toward the clutch plate side by an amount corresponding to the rotation angle.

Then, the pressure plate 80 presses the clutch plates, the surfaces of the clutch plates come into contact with each other, and a frictional force is generated between the clutch plates. The electronically controlled clutch 30 (in one example, the first clutch plates 70 and the second clutch plates 72) is engaged by the frictional force. Thus, the clutch operating motor 76 controls the rotation angle, and as a result, can control an engaging force of the electronically controlled clutch 30. Further, when the electronically controlled clutch 30 is completely engaged, the differential case 52 and the clutch case 28 are mutually restrained and integrally rotate.

An internal gear 100 is formed on the inner peripheral surface of the clutch case 28. The internal gear 100 is disposed on a right side of the rightmost surface of the clutch plate. Further, the internal gear 100 is located on an opposite side (right side) of the differential case 52 to the helical gear 50. The internal gear 100 is coupled to the second clutch plates 72 through the clutch case 28. Further, the internal gear 100 is coupled to the motor generator 34 through the clutch case 28, which will be described later. The internal gear 100 is rotatable around the axis of the first output shaft 24 integrally with the clutch case 28.

The limiting gear 32 is located on the opposite side (right side) of the differential case 52 to the helical gear 50. The limiting gear 32 is, for example, a spur gear. The limiting gear 32 is meshed with the internal gear 100. A rotation shaft of the limiting gear 32 is coupled to the first pinion shaft 60a. The limiting gear 32 operates in conjunction with the differential element 58 (in one example, the first pinion gear 58a).

When the electronically controlled clutch 30 is released, the differential case 52 and the clutch case 28 can rotate individually as described above. In this case, when the first pinion gear 58a rotates, the limiting gear 32 also rotates in conjunction with the first pinion gear 58a. When the limiting gear 32 rotates, the internal gear 100 rotates according to the limiting gear 32. As a result, the clutch case 28 rotates at a rotation speed different from a rotation speed of the differential case 52.

On the other hand, when the electronically controlled clutch 30 is engaged, the clutch case 28 and the differential case 52 integrally rotate as described above. In this case, a revolution speed of the first pinion gear 58a and a rotation speed of the internal gear 100 match. Therefore, the first pinion gear 58a and the limiting gear 32 cannot rotate around an axis of the first pinion gear 58a. When the first pinion gear 58a cannot rotate, the second pinion gear 58b also cannot rotate.

Thus, the electronically controlled clutch 30 restricts the rotation of the differential element 58 (that is, the first pinion gear 58a and the second pinion gear 58b) through the internal gear 100 and the limiting gear 32 in response to the engaging between the first clutch plates 70 and the second clutch plates 72. When the rotation of the differential element 58 (that is, the first pinion gear 58a and the second pinion gear 58b) is restricted, as a result, a rotation speed difference between the first output shaft 24 and the second output shaft 26 is restricted.

An external gear 110 is formed on an outer peripheral surface of the clutch case 28. The external gear 110 is located at an opposite end of the clutch case 28 to the helical gear 50. The external gear 110 is integrated with the clutch case 28, and is rotatable around the axis of the first output shaft 24.

The motor generator 34 is, for example, a synchronous motor or an induction motor. The motor generator 34 is provided separately (independently) from the drive source 10 that inputs a torque to the input shaft 20 of the planetary mechanism 22. The motor generator 34 is coupled to the battery through an inverter (not illustrated). The motor generator 34 can rotate a rotation shaft 120 by consuming the electric power of the battery. Further, the motor generator 34 can generate electric power according to a rotation of the rotation shaft 120. The electric power generated by the motor generator 34 is regenerated to the battery.

An external gear 122 is formed at a tip end of the rotation shaft 120 of the motor generator 34. The external gear 122 is meshed with a reduction gear 124. A rotation shaft of the reduction gear 124 is coupled to a reduction gear 126. The reduction gear 126 is meshed with the external gear 110 of the clutch case 28.

The motor generator 34 is coupled to the clutch case 28 through the rotation shaft 120, the external gear 122, the reduction gears 124, 126, and the external gear 110. That is, the motor generator 34, the second clutch plates 72, the internal gear 100, and the differential element 58 are coupled to each other through the clutch case 28.

The power transmission mechanism 14 has a differential function, a limited-slip differential (LSD) function, a motor drive function, a regenerative function, and a torque vectoring function.

The differential function is a function that allows the first output shaft 24 and the second output shaft 26 to rotate at different rotation speeds. The limited-slip differential function is a function of restricting a rotation speed difference between the first output shaft 24 and the second output shaft 26. The motor drive function is a function capable of outputting equal torques to the first output shaft 24 and the second output shaft 26 according to a rotation of the motor generator 34. The regenerative function is a function of causing the motor generator 34 to generate electric power according to the torque applied to either one of the first output shaft 24 and the second output shaft 26. The torque vectoring function is a function capable of outputting different torques to the first output shaft 24 and the second output shaft 26 according to the rotation of the motor generator 34.

The power transmission mechanism 14 can switch among the differential function, the limited-slip differential function, the motor drive function, the regenerative function, and the torque vectoring function, in response to releasing or engagement of the clutch plates of the electronically controlled clutch 30. Each function will be described in detail below.

Figure 4:
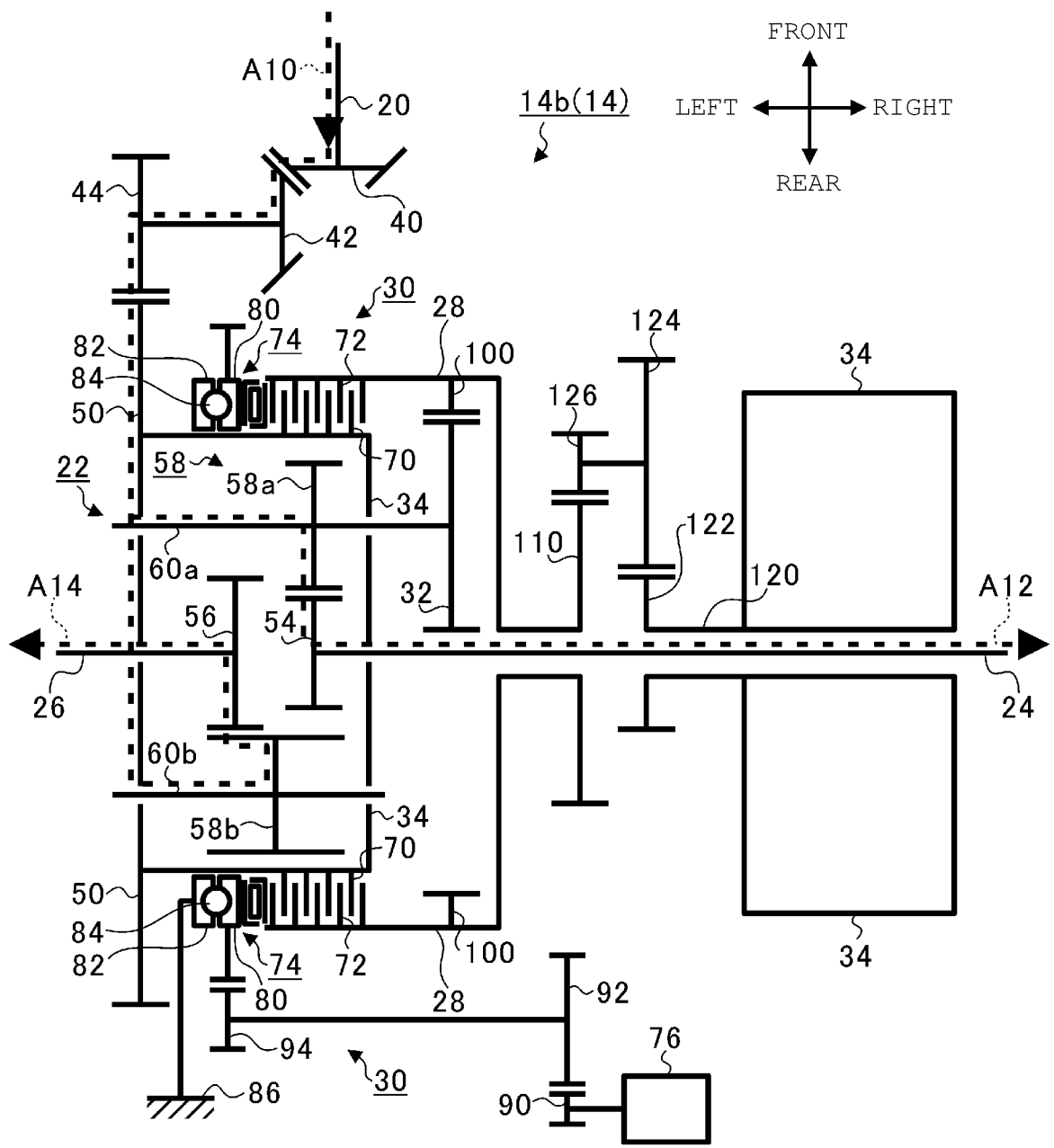
FIG. 4 is a diagram illustrating a differential function.

FIG. 4 is a diagram illustrating the differential function. When the differential function is implemented (during a differential operation), the electronically controlled clutch 30 is released. Further, during the differential operation, the motor generator 34 is stopped.

As indicated by a broken line arrow A10 in FIG. 4, the torque of the drive source 10 is input to the input shaft 20. The torque of the drive source 10 is transmitted from the input shaft 20 to the helical gear 50. The torque of the drive source 10 is output to the first output shaft 24 through the first pinion shaft 60a, the first pinion gear 58a, and the first sun gear 54, as indicated by a broken line arrow A12. In parallel with this, the torque of the drive source 10 is output to the second output shaft 26 through the second pinion shaft 60b, the second pinion gear 58b, and the second sun gear 56, as indicated by a broken line arrow A14. Thus, the torque of the drive source 10 is output to the first output shaft 24 and the second output shaft 26.

For example, when the vehicle 1 turns, a rotation speed difference appears between the left and right wheels 16, that is, between the first output shaft 24 and the second output shaft 26. During the differential operation, the first pinion gear 58a and the second pinion gear 58b rotate to allow the rotation speed difference between the first output shaft 24 and the second output shaft 26.

Here, when either one of the left and right wheels 16 is idling, a rotation speed of the wheel 16 that is idling becomes larger than a rotation speed of the wheels 16 that are not idling. Then, torques transmitted to the wheels 16 that are not idling may decrease, and a stability of the vehicle 1 may decrease. Therefore, the limited-slip differential function is implemented such that a rotation speed difference between the left and right wheels 16 does not become too large.

Figure 5:
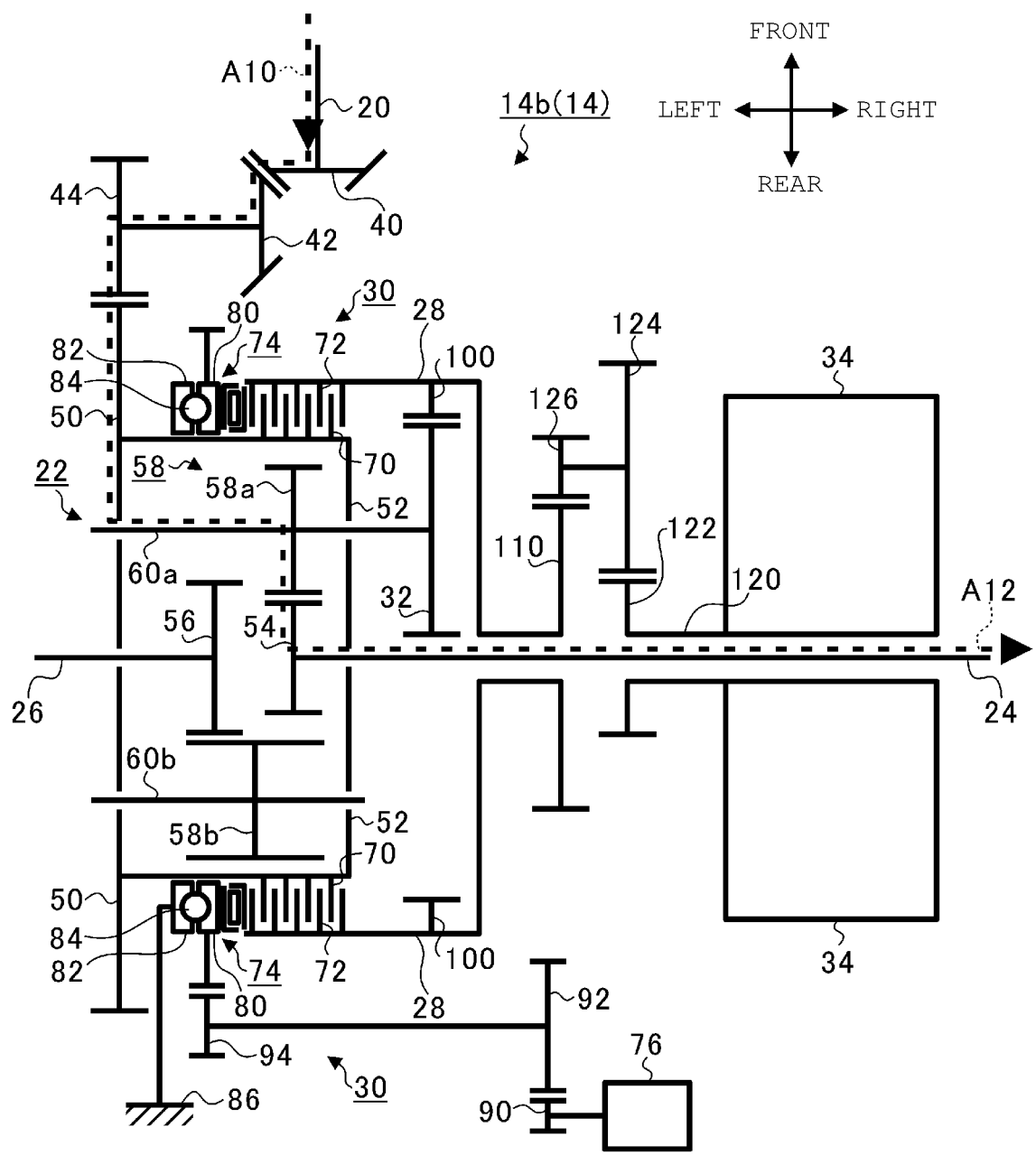
FIG. 5 is a diagram illustrating a limited-slip differential function when a left wheel is idling.

FIG. 5 is a diagram illustrating the limited-slip differential function when the left wheel 16 is idling. When the limited-slip differential function is implemented (during the limited-slip differential operation), the electronically controlled clutch 30 is engaged. During the limited-slip differential operation, a magnitude of the engaging force of the electronically controlled clutch 30 (that is, a magnitude of a slip-limiting torque) can be controlled to any magnitude. Further, during the limited-slip differential operation, the motor generator 34 is stopped.

When the electronically controlled clutch 30 is engaged, as described above, the clutch case 28 is restrained by the differential case 52, and the rotations of the first pinion gear 58a and the second pinion gear 58b are limited through the internal gear 100 and the limiting gear 32. Then, through the first sun gear 54 and the first output shaft 24, a decrease in the rotation speed of the right wheel 16 that is not idling is prevented.

Further, by limiting the rotations of the first pinion gear 58a and the second pinion gear 58b, the torque of the drive source 10 (as indicated by the broken line arrow A10) is output to the first output shaft 24 (as indicated by the broken line arrow A12), and it is prevented that the torque is output to the second output shaft 26 in a wasteful manner.

Figure 6:
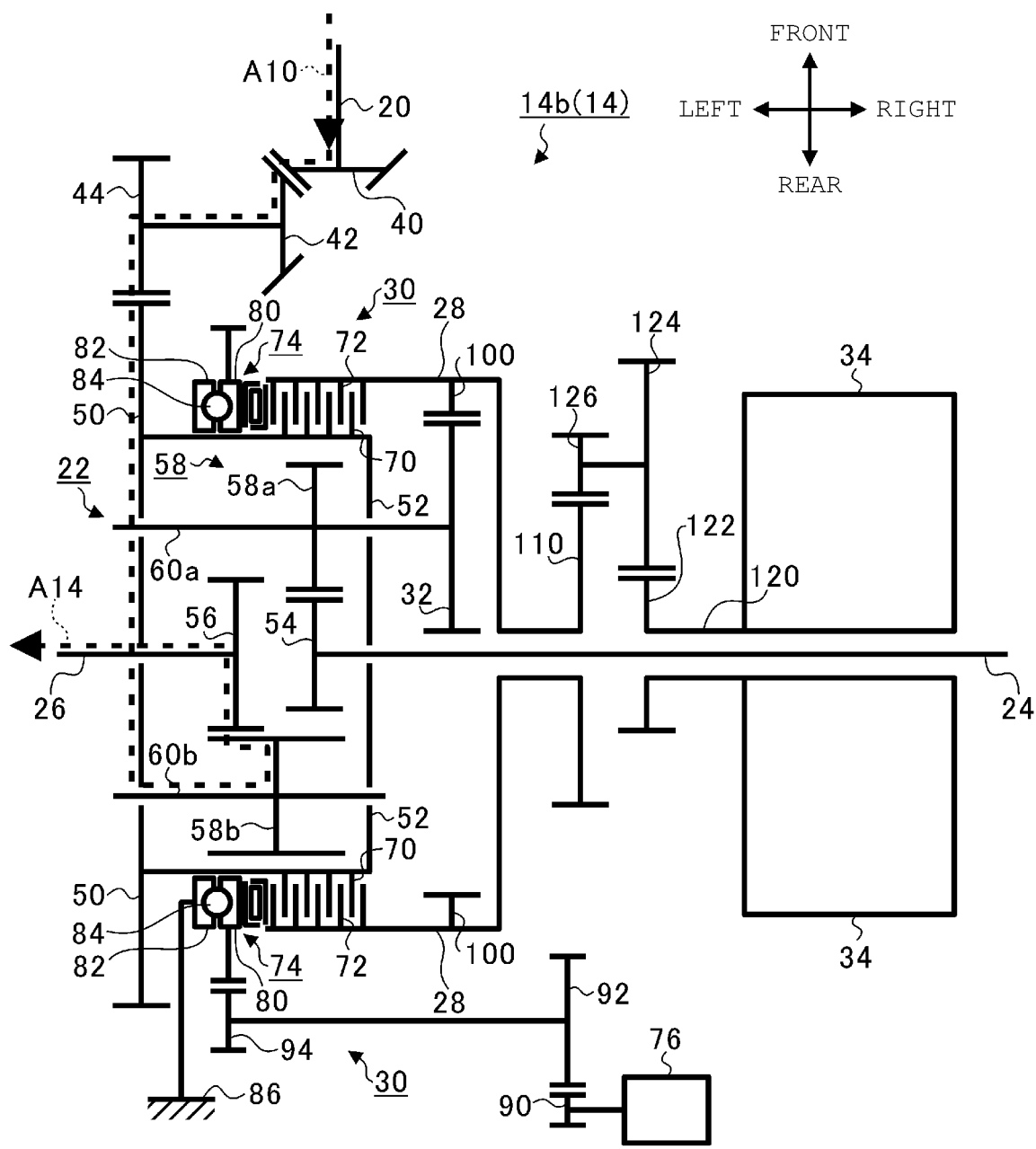
FIG. 6 is a diagram illustrating a limited-slip differential function when a right wheel is idling.

FIG. 6 is a diagram illustrating the limited-slip differential function when the right wheel 16 is idling. When the right wheel 16 is idling, the electronically controlled clutch 30 is engaged and the limited-slip differential function is implemented in the same manner as when the left wheel 16 is idling.

When the electronically controlled clutch 30 is engaged, the rotations of the first pinion gear 58a and the second pinion gear 58b are limited, and therefore, through the second sun gear 56 and the second output shaft 26, a decrease in the rotation speed of the left wheel 16 that is not idling is prevented. Further, by limiting the rotations of the first pinion gear 58a and the second pinion gear 58b, the torque of the drive source 10 (as indicated by the broken line arrow A10) is output to the second output shaft 26 (as indicated by the broken line arrow A14), and it is prevented that the torque is output to the first output shaft 24 in a wasteful manner.

Thus, when the limited-slip differential function is implemented, it is possible to prevent a decrease in torques transmitted to the wheels 16 that are not idling. As a result, it is possible to prevent a decrease in the stability of the vehicle 1.

Figure 7:
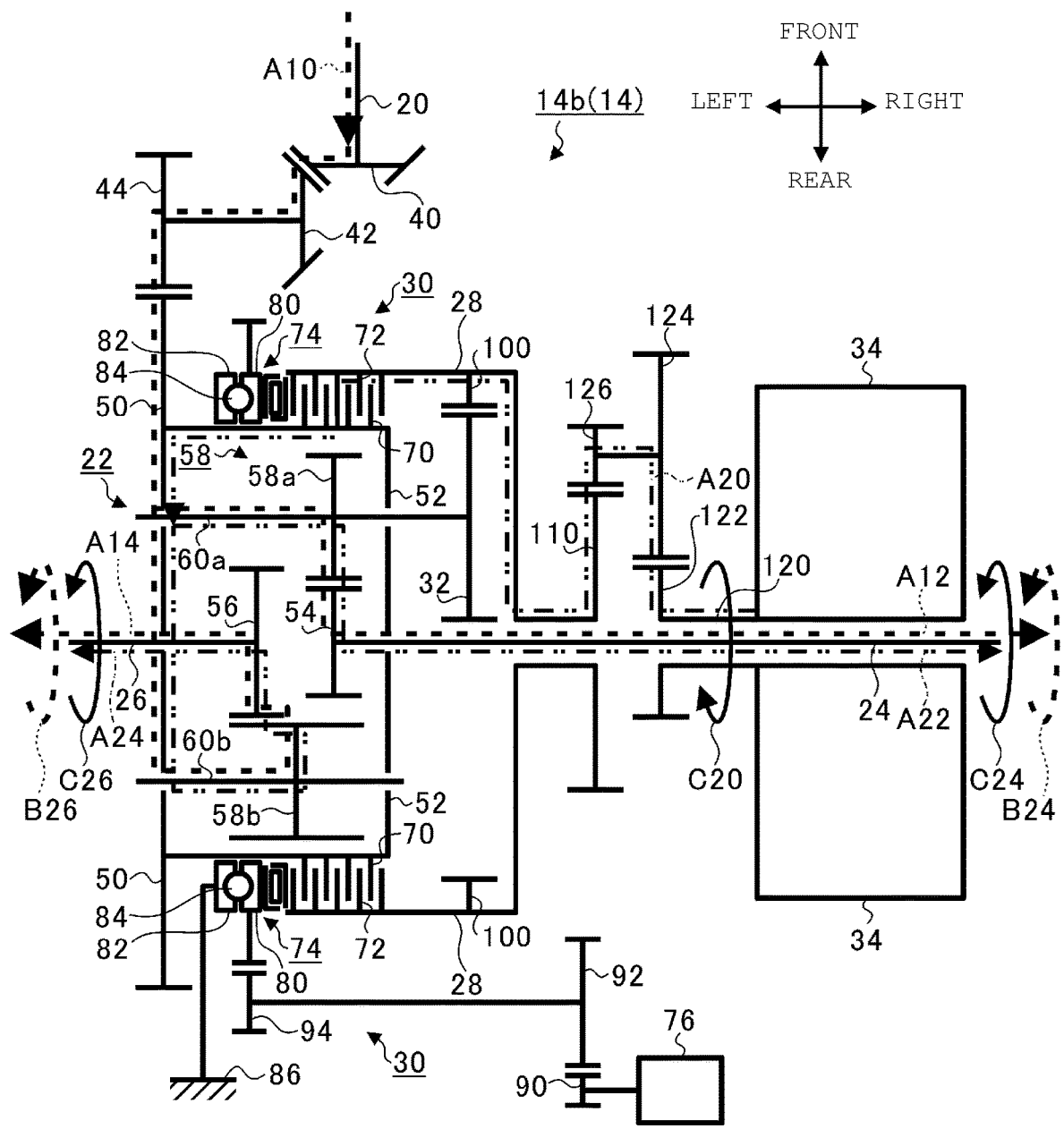
FIG. 7 is a diagram illustrating a motor drive function.

FIG. 7 is a diagram illustrating the motor drive function. When the motor drive function is implemented (during a motor drive operation), the electronically controlled clutch 30 is engaged. Further, during the motor drive operation, the motor generator 34 operates as a motor. The motor generator 34 rotates the rotation shaft 120 such that a rotation direction of the clutch case 28 coincides with a rotation direction of the differential case 52.

During the motor drive operation, the torque of the drive source 10 is output to the first output shaft 24 and the second output shaft 26 as in the differential function. During the motor drive operation, in addition to the torque of the drive source 10, a torque of the motor generator 34 is also output to the first output shaft 24 and the second output shaft 26.

In one example, the torque of the motor generator 34 is transmitted to the clutch case 28 as indicated by a two-dot chain line arrow A20. Since the electronically controlled clutch 30 is engaged, the torque of the motor generator 34 is transmitted to the differential case 52 and the helical gear 50 through the clutch plate.

The torque of the motor generator 34 is output to the first output shaft 24 through the first pinion shaft 60a, the first pinion gear 58a, and the first sun gear 54, as indicated by a two-dot chain line arrow A22. In parallel with this, the torque of the motor generator 34 is output to the second output shaft 26 through the second pinion shaft 60b, the second pinion gear 58b, and the second sun gear 56, as indicated by a two-dot chain line arrow A24.

For example, it is assumed that the torque of the drive source 10 is output counterclockwise from the first output shaft 24 and the second output shaft 26, as indicated by an arrow B24 and an arrow B26. Then, it is assumed that the motor generator 34 outputs a torque for rotating the rotation shaft 120 clockwise as indicated by an arrow C20.

The first pinion gear 58a revolves together with the differential case 52, so that the torque of the motor generator 34 is output counterclockwise from the first output shaft 24 as indicated by an arrow C24. Further, the second pinion gear 58b revolves together with the differential case 52, so that the torque of the motor generator 34 is output counterclockwise from the second output shaft 26 as indicated by an arrow C26. That is, a rotation direction of the first output shaft 24 (for example, the arrow C24) by the motor generator 34 and a rotation direction of the second output shaft 26 (for example, the arrow C26) by the motor generator 34 are the same direction. Further, the torque of the motor generator 34 is output equally to the first output shaft 24 and the second output shaft 26.

As described above, the motor generator 34 rotates the clutch case 28 in the same direction as that of the differential case 52. Accordingly, the rotation direction of each of the first output shaft 24 and the second output shaft 26 by the torque of the drive source 10 and the rotation direction of each of the first output shaft 24 and the second output shaft 26 by the torque of the motor generator 34 become the same direction.

In the first output shaft 24, the counterclockwise torque of the drive source 10 (the arrow B24) and the counterclockwise torque of the motor generator 34 (the arrow C24) are added. Since the torques in the same direction are added, the torque output from the first output shaft 24 is higher than the torque of the drive source 10.

In the second output shaft 26, the counterclockwise torque of the drive source 10 (the arrow B26) and the counterclockwise torque of the motor generator 34 (the arrow C26) are added. Since the torques in the same direction are added, the torque output from the second output shaft 26 is also higher than the torque of the drive source 10. From the above, during the motor drive operation, an acceleration of the vehicle 1 can be assisted by the torque of the motor generator 34 in addition to the torque of the drive source 10.

However, since the electronically controlled clutch 30 is engaged during the motor drive operation, the differential element 58 cannot rotate, and the differential function for the first output shaft 24 and the second output shaft 26 do not work.

Figure 8:
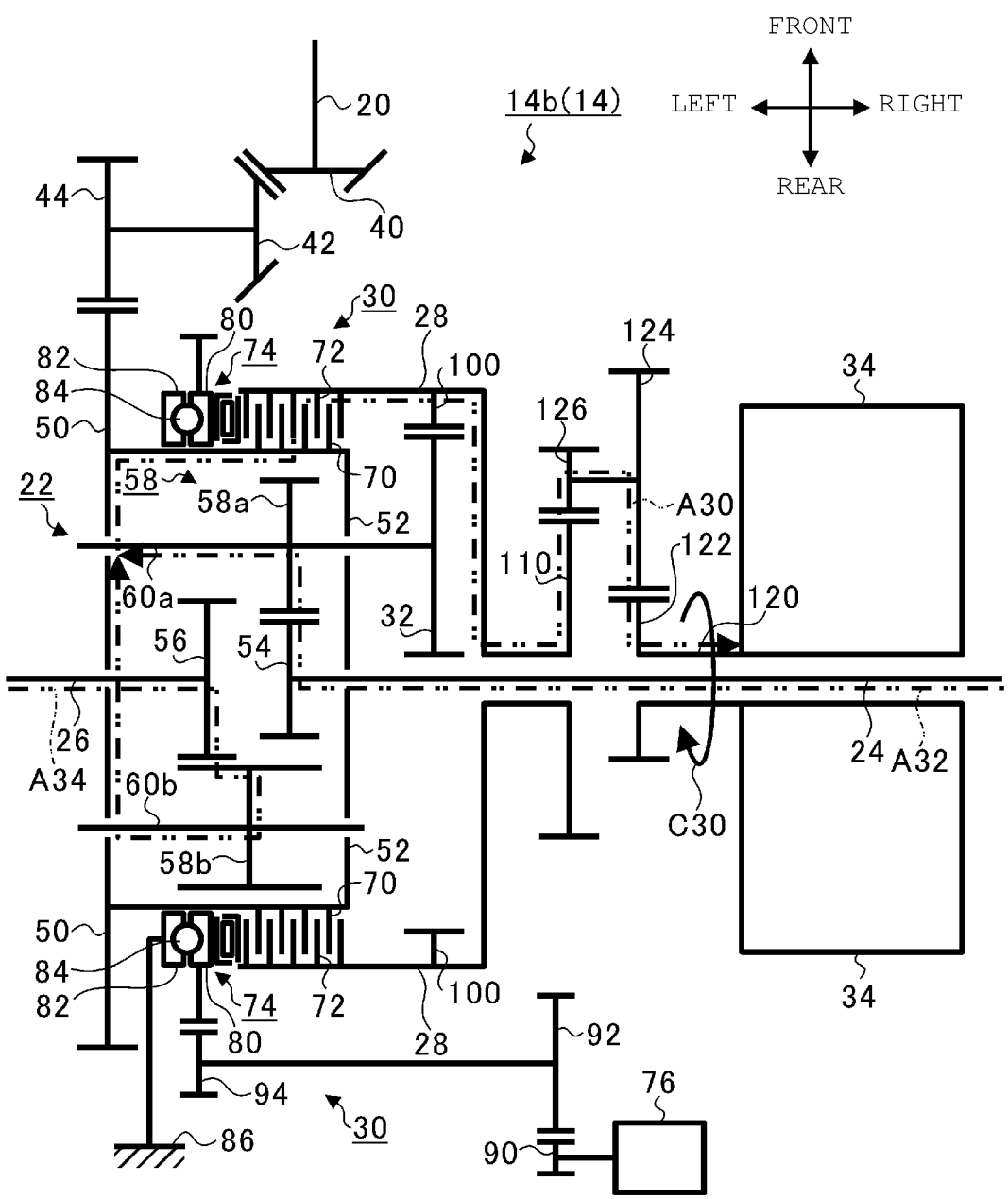
FIG. 8 is a diagram illustrating a regenerative function.

FIG. 8 is a diagram illustrating the regenerative function. When the regenerative function is implemented (during a regenerative operation), the electronically controlled clutch 30 is engaged. Further, during the regenerative operation, the motor generator 34 operates as a generator.

The regenerative function is implemented, for example, when the vehicle 1 decelerates. When the vehicle 1 is decelerated, the torque of the drive source 10 is not transmitted to the wheels 16, and the torque corresponding to the rotation of the wheels 16 is applied to the first output shaft 24 and the second output shaft 26.

The torque of the wheel 16 applied to the first output shaft 24 is transmitted to the helical gear 50 and the differential case 52 through the first sun gear 54, the first pinion gear 58a, and the first pinion shaft 60a, as indicated by a two-dot chain line arrow A32. Further, the torque of the wheel 16 applied to the second output shaft 26 is transmitted to the helical gear 50 and the differential case 52 through the second sun gear 56, the second pinion gear 58b, and the second pinion shaft 60b, as indicated by a two-dot chain line arrow A34.

Since the electronically controlled clutch 30 is engaged, the torques of the wheels 16 are transmitted to the clutch case 28 through the clutch plate. At this time, the torques of the wheels 16 rotate the clutch case 28 such that the rotation direction of the clutch case 28 coincides with the rotation direction of the differential case 52. Then, the torques of the wheels 16 are transmitted to the rotation shaft 120 to rotate the rotation shaft 120 as indicated by an arrow C30. Accordingly, the motor generator 34 generates electric power, and the generated electric power is regenerated into the battery.

It is noted that since the electronically controlled clutch 30 is engaged during the regenerative operation, the differential element 58 cannot rotate, and the differential function for the first output shaft 24 and the second output shaft 26 do not work.

Figure 9:
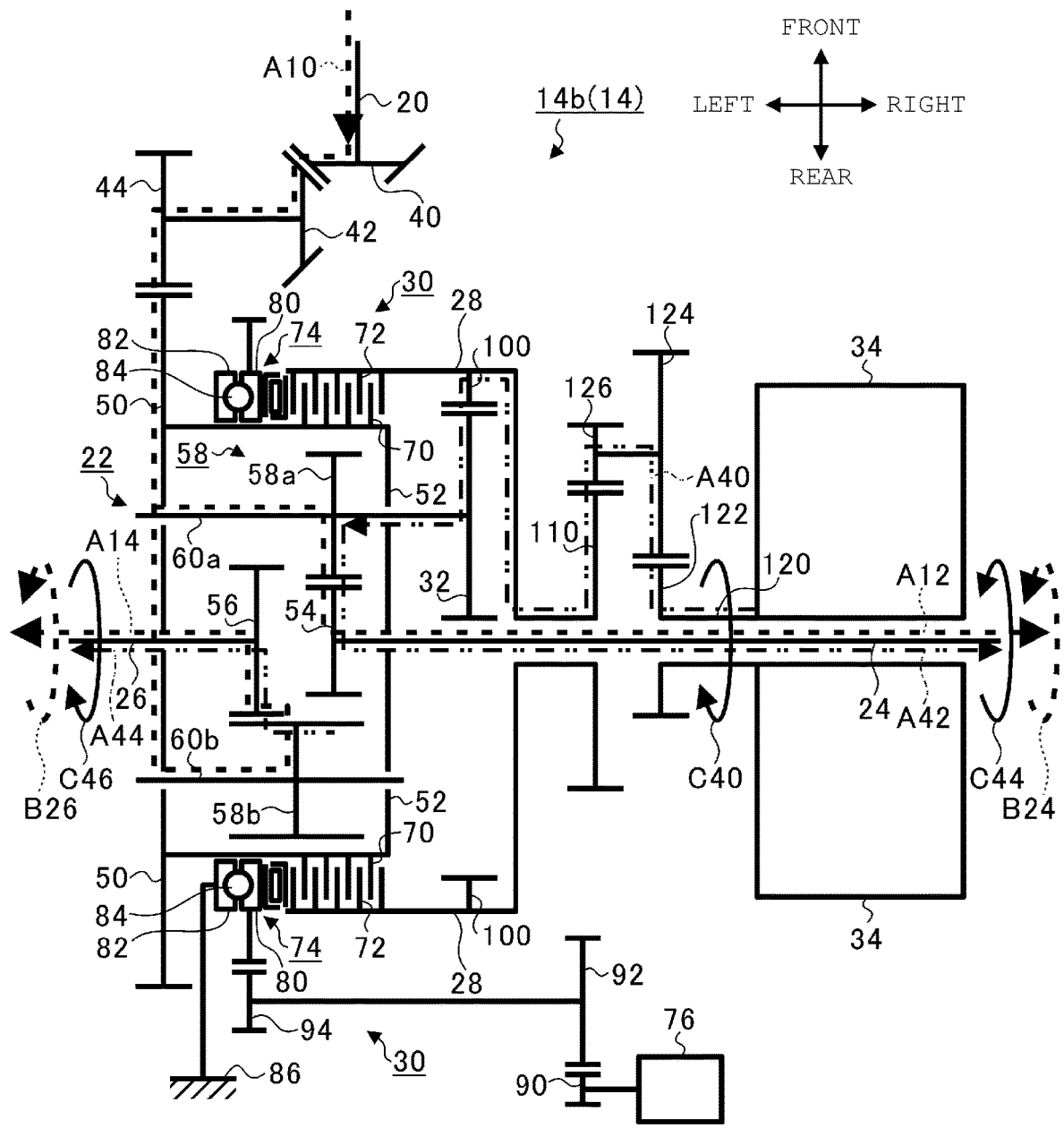
FIG. 9 is a diagram illustrating a torque vectoring function.

FIG. 9 is a diagram illustrating the torque vectoring function. When the torque vectoring function is implemented (during a torque vectoring operation), the electronically controlled clutch 30 is released. Further, during the torque vectoring operation, the motor generator 34 operates as a motor. The motor generator 34 may rotate the rotation shaft 120 in any direction regardless of the rotation direction of the differential case 52.

During the torque vectoring operation, the torque of the drive source 10 is output to the first output shaft 24 and the second output shaft 26 as in the differential operation. During the torque vectoring operation, in addition to the torque of the drive source 10, the torque of the motor generator 34 is also output to the first output shaft 24 and the second output shaft 26.

In one example, the torque of the motor generator 34 is transmitted to the clutch case 28 and is transmitted to the limiting gear 32 through the internal gear 100, as indicated by a two-dot chain line arrow A40. Since the limiting gear 32 operates in conjunction with the first pinion gear 58a, the torque of the motor generator 34 is transmitted to the first pinion gear 58a.

The torque of the motor generator 34 is transmitted from the first pinion gear 58a to the first output shaft 24 through the first sun gear 54, as indicated by a two-dot chain line arrow A42. In parallel with this, the torque of the motor generator 34 is transmitted from the first pinion gear 58a to the second pinion gear 58b and is transmitted to the second output shaft 26 through the second sun gear 56, as indicated by a two-dot chain line arrow A44.

For example, it is assumed that the torque of the drive source 10 is output counterclockwise from the first output shaft 24 and the second output shaft 26, as indicated by the arrow B24 and the arrow B26. It is also assumed that the motor generator 34 outputs the torque for rotating the rotation shaft 120 clockwise as indicated by an arrow C40.

The first pinion gear 58a rotates through the limiting gear 32, so that the first output shaft 24 outputs the torque of the motor generator 34 counterclockwise as indicated by an arrow C44. On the other hand, the second pinion gear 58b rotates in a direction opposite to that of the first pinion gear 58a, so that the second output shaft 26 outputs the torque of the motor generator 34 clockwise as indicated by an arrow C46. That is, the rotation direction of the first output shaft 24 (the arrow C44) by the motor generator 34 and the rotation direction of the second output shaft 26 (the arrow C46) by the motor generator 34 are opposite directions.

In the first output shaft 24, the counterclockwise torque of the drive source 10 (the arrow B24) and the counterclockwise torque of the motor generator 34 (the arrow C44) are added. Since the torques in the same direction are added, the torque output from the first output shaft 24 is higher than the torque of the drive source 10.

On the other hand, in the second output shaft 26, the counterclockwise torque of the drive source 10 (the arrow B26) and the clockwise torque of the motor generator 34 (the arrow C46) are added. Since the torques in different directions are added, the torque output from the second output shaft 26 is lower than the torque of the drive source 10.

Accordingly, the torque of the right wheel 16 becomes higher than the torque of the left wheel 16. Therefore, the vehicle 1 turns to the left even if a turning operation is not performed.

When a direction of the torque output from the motor generator 34 is opposite (counterclockwise), a direction of the torque of the motor generator 34 is clockwise on the first output shaft 24 and is counterclockwise on the second output shaft 26. In this case, since torques in different directions are added to the first output shaft 24, the torque of the first output shaft 24 is lower than the torque of the drive source 10. On the other hand, since torques in the same direction are added to the second output shaft 26, the torque of the second output shaft 26 is higher than the torque of the drive source 10. Then, the torque of the left wheel 16 becomes higher than the torque of the right wheel 16, and the vehicle 1 turns to the right even if a turning operation is not performed.

As described above, in the power transmission mechanism 14 of the present embodiment, either one of the differential function and the torque vectoring function can be implemented by releasing the electronically controlled clutch 30, and one selected from the group consisting of the limited-slip differential function, the motor drive function, and the regenerative function can be implemented by engaging the electronically controlled clutch 30. Then, in the power transmission mechanism 14 of the present embodiment, a function is switched between (i) either one of the differential function and the torque vectoring function and (ii) one selected from the group consisting of the limited-slip differential function, the motor drive function, and the regenerative function can be switched by the electronically controlled clutch 30.

Therefore, according to the power transmission mechanism 14 of the present embodiment, it is possible to implement many functions with a simple configuration.

Further, in the power transmission mechanism 14 of the present embodiment, a traveling performance can be improved by the limited-slip differential function, a torque performance can be improved by the motor drive function, an energy efficiency can be improved by the regenerative function, and a steering stability can be improved by the torque vectoring function.

Further, in the power transmission mechanism 14 of the present embodiment, the torque vectoring function can be implemented by one motor generator 34. Therefore, the power transmission mechanism 14 can be made smaller and lighter than in a case in which motors are provided on the left and right wheels 16 to perform torque vectoring.

Further, in the power transmission mechanism 14 of the present embodiment, the limited-slip differential function and the motor drive function can be implemented at the same time, and the limited-slip differential function and the regenerative function can be implemented at the same time.

Further, in the power transmission mechanism 14 of the present embodiment, the limited-slip differential operation is controlled by the clutch operating motor 76 different from the motor generator 34, a limited-split differential capacity can be increased.

The limiting gear 32 of the power transmission mechanism 14 operates in conjunction with the first pinion gear 58a. However, the limiting gear 32 may operate in conjunction with the second pinion gear 58b. That is, the second clutch plate 72 and the motor generator 34 may be coupled to either one of the first pinion gear 58a and the second pinion gear 58b.

Further, the differential element 58 of the power transmission mechanism 14 is implemented by a double pinion. However, the differential element 58 is not limited to the double pinion, and may have any configuration that can rotate the first output shaft 24 and the second output shaft 26 at different rotation speeds.

The embodiment of the disclosure has been described above with reference to the accompanying drawings. It is needless to say that the disclosure is not limited to such an embodiment. It will be apparent to those skilled in the art that various changes and modifications may be conceived within the scope of the claims, and it is understood that such changes and modifications also fall within the technical scope of the disclosure.

For example, the power transmission mechanism 14 may be applied to either one of a rear differential device, a front differential device, and a center differential device.

The invention claimed is:

1. A power transmission mechanism comprising:
a planetary mechanism coupled to an input shaft, a first output shaft, and a second output shaft, the planetary mechanism comprising a differential element configured to rotate the first output shaft and the second output shaft at different rotation speeds, the planetary mechanism being configured to output a torque input from the input shaft to the first output shaft and the second output shaft;
an electronically controlled clutch comprising a first clutch plate and a second clutch plate, the first clutch plate being coupled to a member of the planetary mechanism different from the differential element, the second clutch plate being coupled to the differential element, the first clutch plate and the second clutch plate facing each other, the electronically controlled clutch being configured to allow the differential element to rotate the first output shaft and the second output shaft at the different rotation speeds when the first clutch plate and the second clutch plate are in a released state, the electronically controlled clutch being configured to restrict a rotation speed difference between the first output shaft and the second output shaft in response to engaging between the first clutch plate and the second clutch plate; and
a motor generator coupled to the second clutch plate and the differential element,
wherein the differential element comprises
a first pinion gear meshed with a first sun gear coupled to the first output shaft, and
a second pinion gear meshed with a second sun gear coupled to the second output shaft, the second pinion gear being meshed with the first pinion gear, and
wherein the second clutch plate and the motor generator are coupled to either one of the first pinion gear and the second pinion gear.

2. The power transmission mechanism according to claim 1, wherein
the first output shaft and the second output shaft are disposed on a same straight line,
the planetary mechanism comprises a differential case coupled to the input shaft, the differential case supporting the differential element in such a manner that the differential element is revolvable around axes of the first output shaft and the second output shaft and is rotatable, and
the first clutch plate is coupled to the differential case.

3. The power transmission mechanism according to claim 2, further comprising:
an internal gear coupled to the second clutch plate and the motor generator, the internal gear being revolvable around the axes of the first output shaft and the second output shaft; and
a limiting gear meshed with the internal gear, the limiting gear being configured to operate in conjunction with the differential element, wherein
the electronically controlled clutch restricts a rotation of the differential element through the internal gear and the limiting gear in response to the engaging between the first clutch plate and the second clutch plate.

4. The power transmission mechanism according to claim 1, further comprising:
an internal gear coupled to the second clutch plate and the motor generator, the internal gear being revolvable around axes of the first output shaft and the second output shaft; and
a limiting gear meshed with the internal gear, the limiting gear being configured to operate in conjunction with the differential element, wherein
the electronically controlled clutch restricts a rotation of the differential element through the internal gear and the limiting gear in response to the engaging between the first clutch plate and the second clutch plate.

* * * * *